United States Patent [19]

Matsuyama et al.

[11] Patent Number: 4,984,351

[45] Date of Patent: Jan. 15, 1991

[54] MACHINE TOOL

[75] Inventors: Futoshi Matsuyama, Nagoya; Akira Hirose, Kounan; Toshiyuki Takei, Nagoya, all of Japan

[73] Assignee: Brother Kogyo Kabushiki Kaisha, Aichi, Japan

[21] Appl. No.: 366,480

[22] Filed: Jun. 15, 1989

[30] Foreign Application Priority Data

Jun. 27, 1988 [JP] Japan .............................. 63-85318[U]

[51] Int. Cl.$^5$ ............................................ B23Q 3/157
[52] U.S. Cl. .......................................... 29/568; 409/80; 409/158; 29/33 P; 29/561; 51/165.71; 51/165.77
[58] Field of Search ............... 29/568, 33 P, 561, 563, 29/564; 409/219, 235, 145, 158, 80; 408/234, 62, 34, 10, 13; 51/3, 165.71, 165.76, 165.77

[56] References Cited

U.S. PATENT DOCUMENTS

| | | | |
|---|---|---|---|
| 1,060,705 | 5/1913 | Potter | 409/145 |
| 3,371,580 | 3/1968 | Barnes et al. | 409/235 X |
| 3,460,435 | 8/1969 | Hucks et al. | 409/235 X |
| 3,964,617 | 6/1976 | Piotrowski | 29/568 X |
| 4,449,277 | 5/1984 | Hasegawa et al. | 29/33 P |
| 4,505,463 | 3/1985 | Hirai | 269/56 |
| 4,512,068 | 4/1985 | Piotrowski | 29/33 P |

FOREIGN PATENT DOCUMENTS

| | | | |
|---|---|---|---|
| 2302720 | 8/1973 | Fed. Rep. of Germany | 408/234 |
| 59-201732 | 4/1958 | Japan . | |
| 53-15012 | 4/1978 | Japan . | |
| 61-265234 | 11/1986 | Japan . | |
| 63-57035 | 4/1988 | Japan . | |

Primary Examiner—Z. R. Bilinsky
Assistant Examiner—Robert Schultz
Attorney, Agent, or Firm—Oliff & Berridge

[57] ABSTRACT

A machine tool includes two movable tables on which workpiece is mounted. A base mount has an upper surface provided with at least two machinable regions and workpiece handling regions. A column is supported above the base mount and movable in a first direction, and a spindle head is supported on the column and movable in a second direction perpendicular to the first direction. The spindle head is movable over the machinable regions. The tables are arranged in parallelism and movable in a third direction perpendicular to the first and second directions. Each of the tables is movable between each of the machinable regions and the workpiece handling regions. First, second and third drive means are connected to the column, the spindle head and the tables, respectively. The drive means are also connected to a numerical control unit for numerically controlling the movements of the column, the spindle head and the tables in the first, the second and the third directions respectively.

17 Claims, 6 Drawing Sheets

MACHINE TOOL

BACKGROUND OF THE INVENTION

The present invention relates to a machine tool having at least two tables on which at least one workpiece is mounted.

In a conventional machine tool such as a machining center or a drilling center, a palette and a palette changer is installed in order to minimize period for exchanging the workpieces to thereby enhance workability or productivity as described in Japanese Utility Model Application Kokai No. 63-57035. More specifically, according to the conventional machine tool, a stationary machining table is provided, and a plurality of palettes each mounting a workpiece thereon can be moved between the stationary table and the palette changer by palette transferring mechanism. Further, a spindle head is movable in three directions, i.e., X, Y and Z directions extending perpendicular to one another for accessing and machining the workpiece. With such structure, no operational suspensions occur attendant to attachment and detachment of the workpiece to and from the palette.

Such conventional arrangement, however incurs the following disadvantages:

(a) It would be rather difficult to provide the spindle head having high rigidity, since the spindle head is movable in three directions.

(b) High machining accuracy may not be obtainable, since machining error may be conceivable due to three dimensional motions of the spindle head and due to inaccurate fixing of the palette to the stationary machining table. That is the error may be accumulated by the three dimensional motions of the spindle head and inaccurate positioning of the palette with respect to the stationary table.

(c) Various mechanical components are required for transferring the palette and for positioning the palette at a given position of the stationary machining table.

(d) Required are large weights of movable components such as the spindle head, a column for supporting the spindle head and a column base for supporting the column in order to obtain high rigidity capable of performing three dimensional movements of the spindle head. As a result, entire machine tool becomes bulky and moving speed of the spindle head may be lowered.

(e) In connection with item (d), such heavy movable components may be shifted at one location of the machine tool in actual machining. In this case, imbalance in weight may result.

(f) In connection with item (d), entire size of the machine tool becomes large in comparison with the size of the workpiece on the palette. As a result, a spacial problem may occur for installation of the machine tool in a limited space of a factory.

(g) During machining to one workpiece on one palette, another palette mounting another workpiece thereon is introduced into the stationary machining table and is clamped thereto. Further, during machining to the one workpiece on one palette, another palette may be unclamped from the table. When the palette stops moving, or when the palette is clamped or unclamped, or when the palette starts moving, impact force may be propagated to another palette undergoing machining. As a result, machining accuracy may be lowered with respect to the workpiece subjected to machining.

(h) The spindle head is movable in one horizontal direction so as to change machining spots, which horizontal direction is directed perpendicular to the travelling direction of the palette. In this case, the moving area in one machining spot may be decreased in accordance with the increase in numbers of the palette. As a result, it would be impossible to perform machining to a single large scale workpiece.

SUMMARY OF THE INVENTION

It is therefore, an object of the present invention to overcome the above described drawbacks and disadvantages, and to provide an improved machine tool.

Another object of the invention is to provide such an improved machine tool capable of providing a high machining accuracy and reducing weight and numbers of mechanical components, with providing a compact size yet providing high weight balance.

Still another object of the invention is to provide such a compact and low weight machine tool capable of machining a large scale workpiece.

These and other objects are attained in the present invention by providing a machine tool comprising: a base mount having an upper surface provided with at least two machinable regions and workpiece handling regions, a column supported above the base mount and movable in a first direction, a first drive means for moving the column in the first direction, a spindle head for supporting a tool, the spindle head being supported on the column and movable in a second direction perpendicular to the first direction, the spindle head being movable over the machinable regions, a second drive means for moving the spindle head in the second direction, at least two tables for respectively mounting a workpiece thereon, the tables being arranged in parallelism and movable in a third direction perpendicular to the first and second directions, each of the tables being movable between each of the machinable regions and the workpiece handling regions, a plurality of third drive means having numbers equal to the numbers of tables for moving the tables independent of each other in the third direction, and a numerical control unit connected to the first, the second and the third drive means for numerically controlling movements of the column, the spindle head and the tables.

In another aspect, in the present invention, there is provided a machine tool comprising; at least two tables extending and movable in a horizontal plane and provided side by side, table drive means having numbers equal to the numbers of the tables for respectively moving the tables in an extending direction thereof, a spindle head movable in the horizontal plane in a first direction perpendicular to the extending direction of the table and movable in a vertical direction, a first drive means connected to the spindle head for moving the spindle head in the first direction, a second drive means connected to the spindle head for moving the spindle head in the vertical direction, and a numerical control unit for numerically controlling each of the table drive means, the first and second drive means.

The plurality of tables correspond to the conventional plurality of palettes. Each of the tables is movable independent of each other by the drive means, so that each of the tables is movable between the machining and non machining regions. The drive means moves the tables in one horizontal direction perpendicular to moving directions of the spindle head, the moving directions being another horizontal direction and a vertical direction. The drive means is subjected to numerical control so as to move the tables independent of each other or to move the tables synchronously. In the latter case, a single large scale workpiece can undergo machining by mounting the workpiece onto the plurality of tables.

DETAILED DESCRIPTION OF THE PREFERRED EMBODIMENTS

A machine tool according to a first embodiment of this invention will be described with reference to FIGS. 1 thru 8. Throughout the specification, the expression "front", "rear", "above", "below" and "laterally" are used herein to define the various parts when the machine tool is disposed in an orientation in which it is intended to be used.

Figure 1:
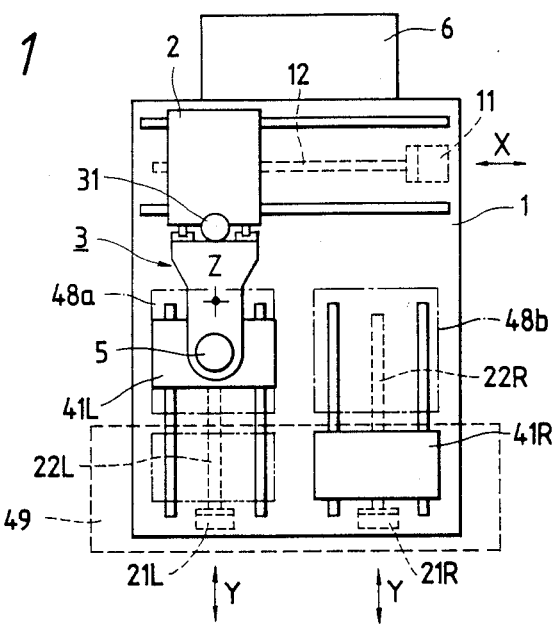
FIG. 1 is a plan view showing a machine tool according to a first embodiment of this invention, and in which each of workpieces is mounted on each of tables.
Figure 2:
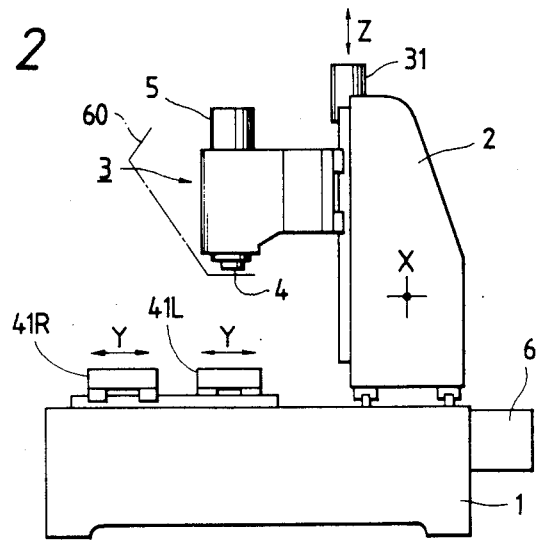
FIG. 2 is a side elevational view showing the machine tool according to the first embodiment.

As shown in FIGS. 1 and 2, a base mount 1 is disposed on which a column 2 is disposed slidable in lateral direction (X direction). The column 2 is drivingly connected to a X-axis drive servo motor 11 through a X-axis feed shaft 12, so that the column 2 is laterally movable within a machinable region.

A spindle head 3 is supported on the column 2, and a Z-axis drive servo motor 31 is mounted on the column 2. The Z-axis drive servo motor 31 is drivingly connected to the spindle head 3 through a Z-axis feed shaft (not shown), so that the spindle head 3 is slidably movable in vertical direction (Z direction) with respect to the column 2. Further, the spindle head 3 mounts thereon a spindle servo motor 5, and a spindle 4 is rotatably supported on the spindle head 3. The spindle 4 is rotatable about its axis by the driving connection to the spindle servo motor 5. With the structure, the spindle is vertically movable into and out of the machinable region. For example, an elevated or ascent position of the spindle head 3 defines non-machinable region. In the first embodiment, the spindle 4 extends in vertical direction.

An automatic tool changer (ATC) 60 is disposed at one side portion of the spindle head 3. Further, a numerical control unit 6 is provided at the base mount 1. The ATC holds a plurality of tools, and is adapted to automatically change a tool with a new toOl in response to a signal sent from the numerical control unit 6. The X axis drive servo motor 11 is connected to the numerical control unit 6. Therefore, the column 2 is moved in the lateral direction (X direction) in response to a signal from the numerical control unit 6.

On the base mount 1, a pair of tables 41L and 41R are laterally arranged. These tables 41R and 41L extend in horizontal plane and arranged in parallelism. The right and left tables 41R and 41L are movable in the horizontal plane, i.e., slidably movable in frontward and rearward direction (Y direction) on the base mount, so that each of the tables 41R and 41L can be brought into confrontation with the spindle head 3. More specifically, the tables 41R and 41L are drivingly connected to Y axis drive servo motors 21R 21L through Y axis feed shafts 22R and 22L, respectively. The drive servo motors 21R and 21L are connected to the numerical control unit 6, so that the tables 41R and 41L can be movable into and out of the machinable region independent of each other or synchronously.

In FIG. 1, a left machinable region 48a is provided below the spindle head 3, and a right machinable region 48b is provided laterally. Further, a handling region 49 is provided outside the machinable regions, i.e., frontwardly relative to the machinable regions. This handling region 49 is positioned corresponding to the retracting positions of the tables 41R and 41L so as to mount a new workpiece onto the table and to dismount finished workpiece therefrom. Right and left switches (not shown) are provided. These switches are depressed upon completion of the workpiece handling. These switches are connected to the numerical control unit 6.

In FIG. 1, the left table 41L is moved in the Y direction within the left machinable region 48a, and the right table 41R is at its retracted position (in the handling region 49). In this case, the column 2 is moved in the X direction within the machinable region 48a in order to perform machining on the workpiece on the left table 41L. That is, in conjunction with the movement of the column 2, the spindle head 3 is movable in the horizontal plane in a direction (X direction) perpendicular to the horizontal moving direction (Y direction) of the tables and in a vertical plane in direction (Z direction) perpendicular to the moving direction (Y direction) of the tables.

Next, various operation modes will be described with reference to FIGS. 3 thru 6, in which each of the right and left tables 41R and 41L directly mounts thereon each of workpieces 52 and 51 (53) without using palettes.

Figure 3:
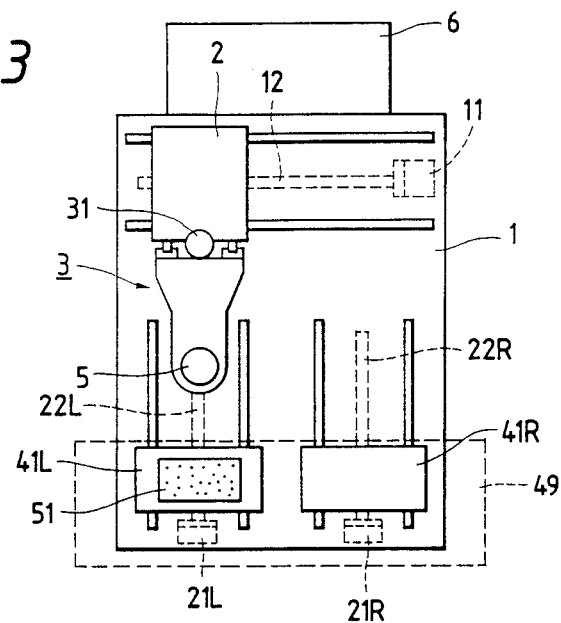
FIGS. 3 thru 6 show plan views for descriptions of various operational modes in the first embodiment.

In FIG. 3, both left and right tables 41L and 41R are positioned on the handling region 49, where the new workpiece 51 is to be mounted on the left table 41L.

Figure 4:
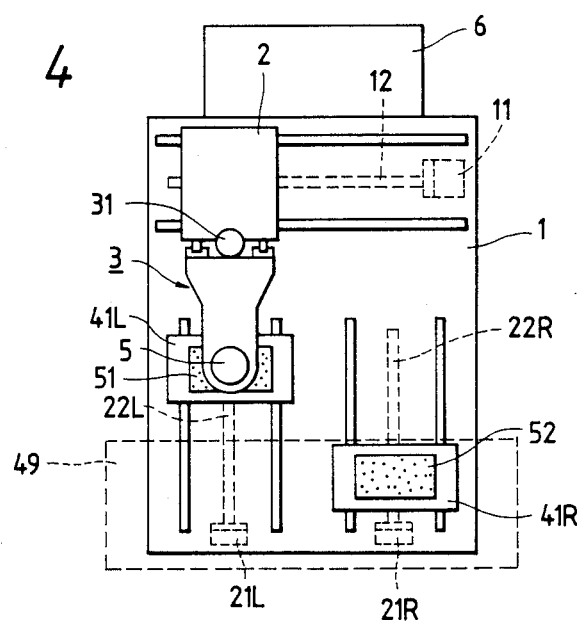

Upon completion of attachment of the new workpiece 51 to the left table 41L, the handling completion switch (not shown) is depressed, so that instruction signal is sent from the numerical control unit 6 to the Y-axis drive servo motor 21L. As a result, the left table 41L is moved in Y direction toward the left machinable region 48a (FIG. 1) for starting machining on the workpiece 51 as shown in FIG. 4. During this machining, the left table 41L is not stationarily held, but is movable in Y direction. Accordingly, the workpiece 51 can be subjected to three dimensional machining simultaneously because of the movement of the spindle 4 in both X and Z directions. In this instance, a new workpiece 52 is mounted on the right table 41R positioned in the handling region 49.

Figure 5:
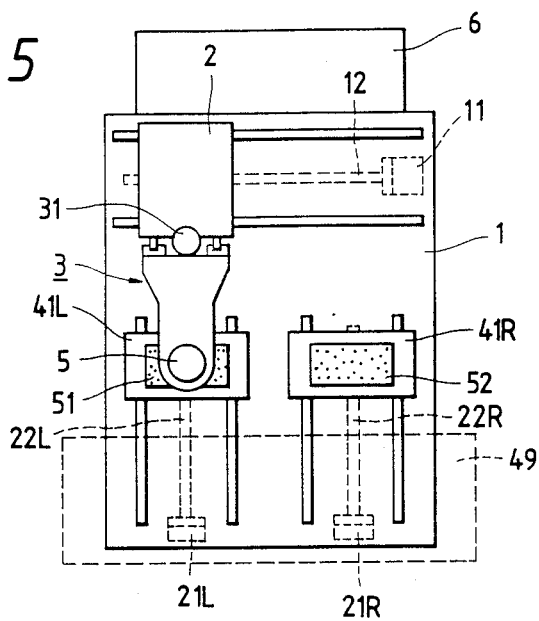

In FIG. 5, upon completion of attachment of the new workpiece 52 to the right table 41R, the handling completion switch (not shown) is depressed, so that the numerical control unit 6 sends signal to the right Y axis drive servo motor 21R, so that the right table 41R is moved into the right machinable region 48b (FIG. 1). The right table 41R maintains its standby position until the machining to the left workpiece 51 is completed.

Figure 6:
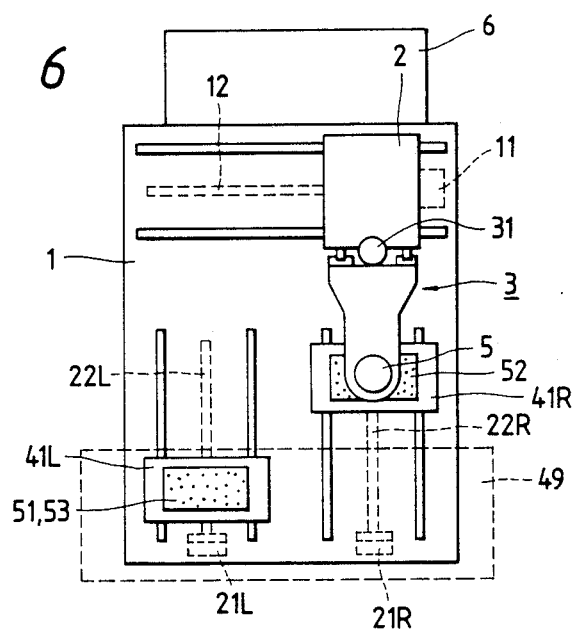

In FIG. 6, when the machining to the left workpiece 51 is finished, the spindle head 3 is travelled in the X direction in response to the program completion signal sent from the numerical control unit 6. As a result, the spindle 4 is coming into a position above the right workpiece 52 on the right table 41R already positioned at the right machinable region 48b. Then, the right workpiece 52 undergoes machining, while the left table 41L is moved out of the left machinable region 48a and is coming into the handling region 49. The workpiece 51 already machined is detached from the left table 41L, and a new workpiece 53 is attached to the table 41L. Then, the handling completion switch is depressed to deliver the left table 41L again into the left machinable region 48a in response to the signal from the numerical control unit 6.

Such operations are repeatedly carried out, and while a workpiece mounted on one of the left and right tables 41L and 41R is subjected to machining, the other workpiece on remaining one of the right and left tables 41R and 41L is changed with a new workpiece and the new workpiece is introduced into the machinable region. Accordingly, machinings on successive workpieces can be performed without any operational break.

Figure 7:
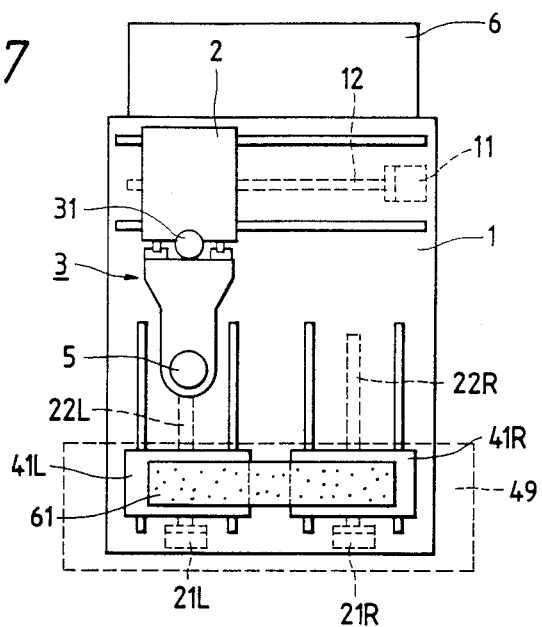
FIGS. 7 and 8 are plan views showing the machine tool according to the first embodiment and in which a large workpiece is bridgedly mounted on two tables.
Figure 8:
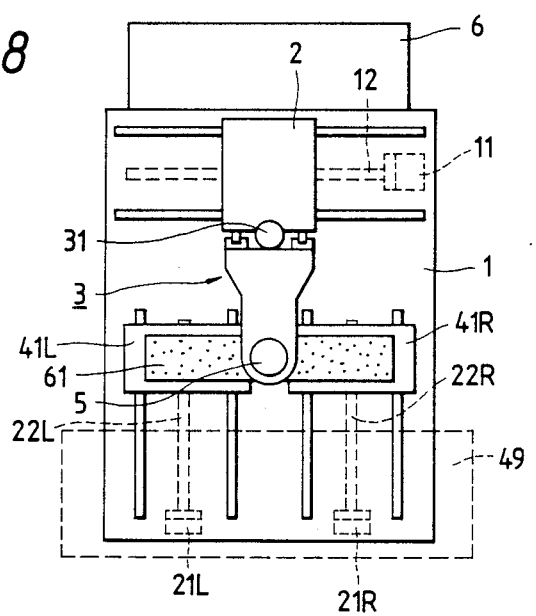

Next, machining to single large scale workpiece 61 will be described with reference to FIGS. 7 and 8. Such large and single workpiece 61 is bridged between the two tables 41L and 41R.

For such machining, the left and right tables 41L and 41R are synchronously movable because of the synchronizing signal sent from the numerical control unit 6 to the left and right drive servo motors 21L and 21R. In FIG. 7, the large workpiece 61 is mounted on both the left and right tables 41L and 41R positioned in the handling region 49. When the handling completion switch is depressed, the left and right tables 41L and 41R are moved synchronously toward the machinable region as if these two tables are an integral member in response to a signal from the numerical control unit 6. As shown in FIG. 8, the large workpiece 61 can be subjected to machining at the machinable region. In this case, both the tables are synchronously movable in Y direction. Therefore, the large workpiece 61 is subjected to three dimensional machining owing to the movement of the spindle 4 in lateral and vertical directions (X and Z directions).

Upon completion of machining to the large workpiece 61, the left and right tables 41L and 41R are moved to their retracted positions (in the handling region 49), where the workpiece 61 is dismounted from the tables, and a new large workpiece is then mounted on the tables.

Therefore, in the present invention, because of the synchronous feeding of the feed shafts 22L and 22R in response to the signal from the numerical control unit 6, the plurality of tables can be synchronously movable, as if these tables are provided integral with each other. As a result, it becomes possible to perform machining to the large workpiece.

Figure 12:
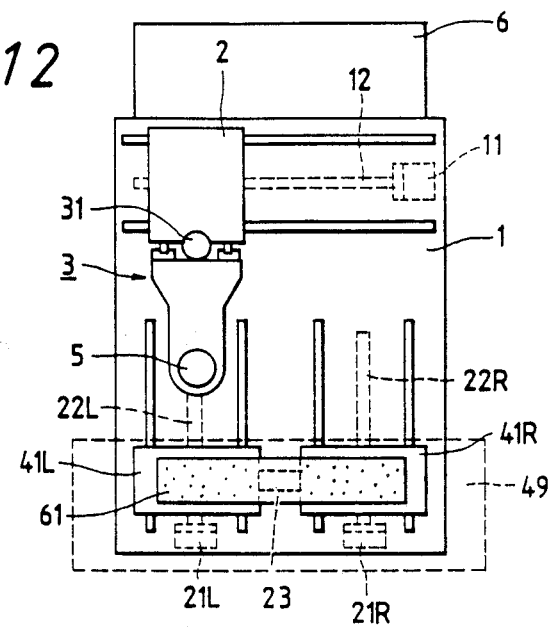
FIG. 12 is a view like FIG. 7 illustrating a modification of the first embodiment.

Further, in one modification illustrated in FIG. 12, the tables 41L and 41R are connected together by means of a linkage member 23, and one of the drive servo motors 21L and 21R is rendered inoperable. With such structure, upon energization of the remaining one of the servo motors 21R and 21L, the table which is associated with the one servo motor can be moved because of the movement of the other table associated with the energized servo motor. By so doing, these tables can be concurrently moved.

Furthermore, in the embodiment described above, the external plan profile of the machine tool has generally rectangular shape. Therefore, the machine tool is advantageous in installation lay-out.

Figure 9:
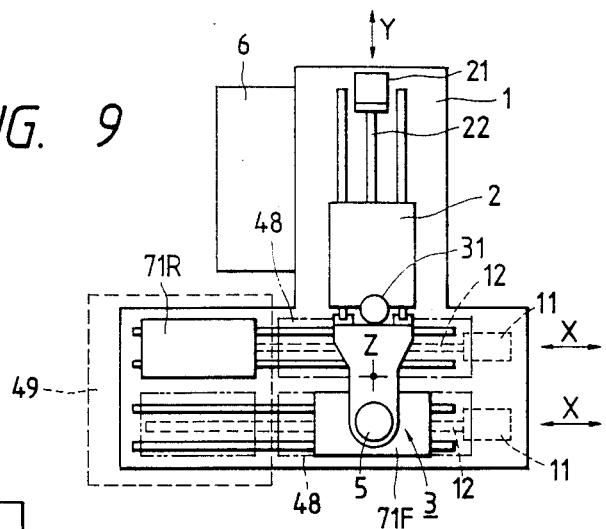
FIG. 9 is a plan view showing a machine tool according to a second embodiment of this invention.

A second embodiment according to this invention will next be described with reference to FIG. 9. In the first embodiment, the plurality of tables are movable in a frontward and rearward direction (Y direction), and the column 2 is movable in a lateral direction (X direction). However, in the second embodiment, the column 2 is movable in the frontward and rearward direction (Y direction), and a plurality of tables 71F and 71R are arranged in parallelism and are movable in lateral direction (X direction). The table 71F is disposed frontwardly with respect to the rear table 71R. In any event, these tables 71F and 71R and the column 2 are movable in the horizontal plane, while a spindle head 3 is movable in vertical direction (Z direction), similar to the first embodiment. In the second embodiment, a spindle 4 extends in vertical direction.

Figure 10:
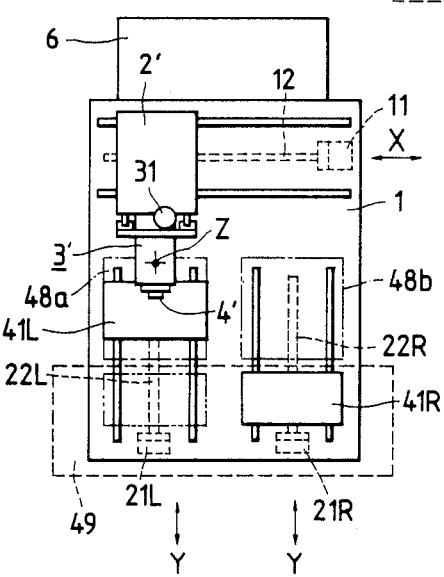
FIG. 10 is a plan view showing a machine tool according to a third embodiment of this invention.

A third embodiment of this invention will be described with reference to FIG. 10. In the third embodiment, a column 2' is movable in the lateral direction (X direction), a spindle head 3' is movable in vertical direction (Z direction), and tables 41L and 41R are movable in frontward and rearward direction (Y direction). Such arrangement would be similar to the first embodiment. However, in the third embodiment, a spindle 4' supported on the spindle head 3' extends in a horizontal direction, i.e., in the Y direction in parallel with the moving direction of the tables 41L 41R so as to effect machining to a side surface of a workpiece. With the structure, for drilling or tapping, drilling or tapping depth is controllable by the movement of the table 41L or 41R.

Figure 11:
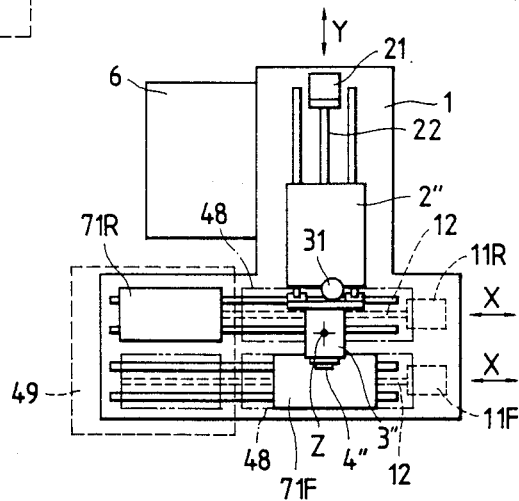
FIG. 11 is a plan view showing a machine tool according to a fourth embodiment of this invention.

A fourth embodiment of this invention will next be described with reference to FIG. 11. In this embodiment, a column 2" is movable in the frontward and rearward direction (Y direction), a spindle head 3" is movable in the vertical direction (Z direction), and tables 71F and 71R are movable in the lateral direction (X direction), similar to the second embodiment. However, a spindle 4" supported on the spindle head 3" extends in a horizontal direction i.e., in the Y direction in parallel with the moving direction of the column 2" so as to effect machining to a side surface of a workpiece. With this structure, for drilling or tapping, drilling or tapping depth is controllable by the movement of the column 2".

In view of the foregoing, according to the present invention, the following advantages are attainable:

(a) Precise machining accuracy is obtainable, since no palette is employed, but the workpiece is directly mounted on the table. Therefore, minute positioning error of the palette with respect to the stationary table does not occur. Further, the spindle head is moved in two directions (not in three directions), and therefore, reduced can be likelihood of error accumulation due to positioning error of the palette and the positioning error of the spindle head. The plurality of tables of the invention may correspond to the conventional palettes, and the tables are driven under numerical control. Therefore, machining accuracy is dependent on only two dimensional motions of the spindle head and one directional motion of the table.

(b) High mechanical rigidity would be obtainable, since the spindle head requires only two dimensional motions.

(c) Numbers of mechanical components can be reduced, since no palette and palette positioning mechanism are required.

(d) Weights of the movable components such as the column base, the column, and the spindle head can be reduced, since high rigidity of these components may not be necessarily required because of the requirement of only two dimensional motions of the spindle head.

(e) Proper weight balance is obtainable in spite of the movements of the movable components, since these components have relatively light weight.

(f) Compact machine tool results, because of the compact structures of the movable components and no employment of the palette and palette positioning mechanism.

(g) No impact force is applied to the workpiece under machining, since palette clamping and unclamping works are not required with respect to the neighboring machining region.

(h) A column base can be dispensed with. The column base is required in a machine tool disclosed in a copending U.S. patent application Ser. No. 251,853 filed on Oct. 3, 1988. Because of the elimination of the column base, moveable components around the spindle head can have light weights. Therefore, entire weight balance can be controlled much easier in comparison with the machine tool described in the copending application.

(i) Ambient space can be reduced, since the spindle head is moved only in two directions, and the plurality of tables are moved in a range substantially equal to the movable range of the conventional palettes.

(j) A large scale workpiece can undergo machining by synchronous motions of the plurality of tables under numerical control, or by integral motions of the plurality of tables by means of mechanical interlinkage therebetween with rendering one of the drive moters inoperable.

(k) Smooth acceleration and deceleration of the tables can be attained because of the numerical control of the tables. Further, movement of one of the tables does not affect the machining of the workpiece mounted on the other table, since the movement of one of the tables is conducted by the numerical control, and no other mechanical component is required for positioning the table.

While the invention has been described in detail and with reference to specific embodiments thereof, it will be apparent to those skilled in the art that various changes and modifications can be made therein without departing from the spirit and scope of the invention.

What is claimed is:

1. A machine tool comprising:
   a base mount having an upper surface provided with at least two machinable regions and workpiece handling regions;
   a column supported above the base mount and movable in a first direction;
   a first drive means for moving the column in the first direction;
   a spindle head for supporting a tool, the spindle head being supported on the column and movable in a second direction perpendicular to the first direction, the spindle head being movable over the machinable regions;
   a second drive means for moving the spindle head in a second direction;
   at least two tables for respectively mounting a workpiece thereon, the tables being arranged in parallelism and movable in a third direction perpendicular to the first and second directions, each of the tables being movable in a first mode wherein the tables move independent of each other and a second mode wherein the tables move together in an integral manner between each of the machinable regions and the workpiece handling regions;
   a plurality of third drive means having numbers equal to the numbers of tables for moving the tables independent of each other or synchronously in the third direction depending upon the movement mode; and
   a numerical control unit connected to the first, the second and the third drive means for numerically controlling movements of the column, the spindle head and the tables, whereby machining to a large scale workpiece spanning more than one table is achievable by the integral motions of the at least two tables in response to an operation of the third drive means.

2. A machine tool comprising:
   at least two tables extending and movable in a horizontal plane and provided side by side, each of the tables being movable in a first mode wherein the tables move independent of each other and a second mode wherein the tables move together in an integral manner;
   table drive mans having numbers equal to the numbers of the tables for individually or synchronously moving the tables in an extending direction thereof;
   a spindle head movable in the horizontal plane in a first direction perpendicular to the extending direction of the tables and movable in a vertical direction;
   a first drive means connected to the spindle head for moving the spindle head in the first direction;
   a second drive means connected to the spindle head for moving the spindle head in the vertical direction; and
   a numerical control unit for numerically controlling each of the table drive means, and the first and second drive means, whereby machining to a large scale workpiece spanning more than one table is achievable by integral motions of the tables in response to the synchronous operation of the table drive means, the numerical control unit controlling the table drive means independent of each other or synchronously depending upon the movement mode, whereby machining to a large scale workpiece spanning more than one table is achievable by integral motions of the tables in response to the synchronous operation of the table drive means.

3. The machine tool as claimed in claim 2, wherein each of the table drive means comprises a servo motor connected to the numerical control unit for providing numerical control thereto, and wherein the first and second drive means comprises respectively, a servo motor connected to the numerical control unit for providing numerical control thereto.

4. The machine tool as claimed in claim 2, wherein the spindle head supports a spindle, the spindle being rotatable about an axis extending in parallel with the vertical direction.

5. The machine tool as claimed in claim 3, wherein the spindle head supports a spindle, the spindle being rotatable about an axis extending in parallel with the vertical direction.

6. The machine tool as claimed in claim 2, wherein the spindle head supports a spindle, the spindle being rotatable about an axis extending in parallel with the extending direction of the tables.

7. The machine tool as claimed in claim 3, wherein the spindle head supports a spindle, the spindle being rotatable about an axis extending in parallel with the extending direction of the tables.

8. The machine tool as claimed in claim 2, wherein the spindle head supports a spindle, the spindle being rotatable about an axis extending in parallel with the first direction of the spindle head.

9. The machine tool as claimed in claim 3, wherein the spindle head supports a spindle, the spindle being rotatable about an axis extending in parallel with the first direction of the spindle head.

10. The machine tool as claimed in claim 4, further comprising a third drive means for moving the spindle, the third drive means comprising a servo motor connected to the numerical control unit.

11. The machine tool as claimed in claim 5, further comprising a third drive means for moving the spindle, the third drive means comprising a servo motor connected to the numerical control unit.

12. The machine tool as claimed in claim 6, further comprising a third drive means for moving the spindle, the third drive means comprising a servo motor connected to the numerical control unit.

13. The machine tool as claimed in claim 7, further comprising a third drive means for moving the spindle, the third drive means comprising a servo motor connected to the numerical control unit.

14. The machine tool as claimed in claim 8, further comprising a third drive means for moving the spindle, the third drive means comprising a servo motor connected to the numerical control unit.

15. The machine tool as claimed in claim 9, further comprising a third drive means for moving the spindle, the third drive means comprising a servo motor connected to the numerical control unit.

16. The machine tool as claimed in claim 2, further comprising an automatic tool changer provided at the spindle head, the automatic tool changer being connected to the numerical control unit.

17. The machine tool as claimed in claim 1, wherein the plurality of tables comprises two tables, and the plurality of third drive means comprises two drive means, and further comprising a linkage means connecting together the two tables, and means for rendering one of the third drive means inoperable, whereby the two tables are movable integrally in response to the operation of the remaining one of the third drive means.

* * * * *